3,421,973
PROTECTION OF PLASTIC MATERIALS
Musa Rasim Kamal, Hamden, Conn., assignor to Formica Corp., Cincinnati, Ohio, a corporation of Delaware
No Drawing. Filed Dec. 20, 1965, Ser. No. 515,225
U.S. Cl. 161—189                                    5 Claims
Int. Cl. B32b 27/30

This invention relates to novel unitary heat and pressure consolidated weatherable laminated articles and to processes for preparing such articles.

More particularly, this invention deals with novel heat and pressure consolidated thermoset resin-bonded multilayer laminates which may be either transparent or colored as the case may be, but in either case are suitable for outdoor use because of their resistance to weathering. In essence, the laminate structure comprises a base or substrate member which is a plastic material, preferably a thermoplastic synthetic resin such as polyvinyl chloride or a thermosetting resin such as a cross-linked polyester. Superimposed upon this substrate of less weatherable plastic, is a quite useful protective overlay of a substantially transparent adherable thin film of polyvinyl fluoride having therein a suitable ultra-violet light absorber and bonded directly to the plastic substrate member by means of a thermoset adhesive resin. By the use of the term "thermosetting adhesive," I intend to refer primarily to a curable resinous composition comprising a reactive water insoluble, curable thermosetting adhesive polyester described in greater detail hereinbelow.

By way of background of the present invention, it should be pointed out that polyvinyl fluoride is an example of an overlay fluorocarbon film which has enjoyed wide acceptance due to its ability to maintain toughness and flexibility over wide ranges of temperature and other conditions of outdoor use. Such overlay films are resistant to attack by chemicals and other common solvents and are available in an unpigmented, substantially transparent form. However, to be effective and thus, gain the advantage of the aforesaid properties of polyvinyl fluoride overlay films, it is essential that a firm bond be established and maintained between the substantially transparent adherable polyvinyl fluoride surface film and the base or substrate member which supplies rigidity to the laminate. In the past, various transparent adhesive resins of the epoxy, acrylic and polyester types have been suggested for this bonding of the fluorocarbon film to the substrate. None of these have been particularly suitable to effectively bond the substantially transparent grade of polyvinyl fluoride film to a plastic substrate such as polyvinyl chloride or a polyester type of core material, to achieve a weather-resistant transparent laminated article.

Where the substrate has been pigmented, particularly with a white pigment, a problem of "chalking" or migration to the surface of the resinous film of the pigment particles exists if the moisture and ultra-violet radiation make contact thereon. In addition, a color change takes place due to such radiant energy degradation. The inclusion of a compatible absorber material such as 2-hydroxy-4-methoxy-benzophenone, 2,2′-dihydroxy-4-methoxy benzophenone, 2-(2′-hydroxy-5′-methylphenyl)benzotriazole, etc. in the overlay will relieve this problem.

The primary object of the present invention is, therefore, to provide a weather resistant laminated article having a substantially transparent top film of polyvinyl fluoride with an added ultraviolet absorber, which top film is tightly bonded to an underlying plastic substrate such that the entire assembly, when heat and pressure consolidated, will yield a laminate useful in a wide range of outdoor architectural, building and industrial applications.

A further object of the invention is to provide a means for preparing such a laminate structure having the aforesaid beneficial attributes. These and other objects of the present invention will become obvious from the following description of my invention set forth below.

In accordance with the practice of my invention therefore, a unitary heat and pressure consolidated weather resistant decorative laminate article is presented which comprises (I) a rigidity imparting plastic substrate or base member and (II) a substantially transparent top film of adherable polyvinyl fluoride, having at least one adherable side which is directly bonded to said rigidity imparting base member by means of (III) a curable adhesive mixture comprising a curable, adhesive polyester resin comprising the esterification product of (A) from about 34 to 49 mol percent of a cycloaliphatic dihydric alcohol, (B) from about 1 to 16 mol percent of an asymmetrical, linear aliphatic dihydric alcohol, (C) from about 30 to 49 mol percent of an α,β-ethylenically unsaturated dicarboxylic acid selected from the group consisting of fumaric acid and itaconic acid and (D) from about 1 to 20 mol percent of a cycloaliphatic dicarboxylic acid wherein the total mol percent of all components is 100%. Any of the aforesaid thermoset adhesive resins may be employed in my invention as a matter of choice since, they all create a satisfactory compatible bond between the base or substrate member and the overlay member of the laminate structure.

Illustrative of cycloaliphatic dihydric alcohols of component (A) of the polyester resin are cyclohexanediol-1,2; cyclohexanediol-1,3; cyclohexanediol-1,4; cyclohexanedimethanol-1,2; cyclohexanedimethanol-1,3; cyclohexanedimethanol-1,4; cyclohexanediethanol-1,4; hydrogenated bis-phenol A [further identified as isopropylidinebis(p-hydroxycyclohexane)], e.g. 2,2-propylidine bis parahydroxy cyclohexane and the like. The hydroxy groups in the hydrogenated bisphenol A are generally in the p,p′ position when secured from commercial sources. Additionally, one may use the hydrogenated bisphenols such as those disclosed in the U.S. Patent 2,118,954. These cycloaliphatic dihydric alcohols may be used either singly or in combination with one another in the compositions of the present invention, but the requirement with respect to the mol percent ratio is still applicable whether one or more cycloaliphatic dihydric alcohols are used.

Illustrative of an asymmetrical linear aliphatic dihydric alcohol of component B are 1,3-butylene glycol, 1,2-butylene glycol, pentanediol-1,2, pentanediol-1,3, pentanediol-1,4, hexanediol-1,3, hexanediol-1,4, octanediol-1,6, octanediol-2,5, and the like. These asymmetrical dihydric alcohols may be used either singly or in combination with one another, but the proportion requirement remains the same in either event.

The α,β-ethylenically unsaturated dicarboxylic acids of component C may be used either separately or in combination with one another and the proportion requirement remains the same. However, when itaconic acid is used as the α,β-ethylenically unsaturated dicarboxylic acid, the measure of the asymmetrical dihydric alcohol may be diminished proportionately if desired, since itaconic acid is in itself, asymmetrical and it is the lack of symmetry in the glycol and/or in the itaconic acid which aids in producing the noncrystalline characteristic in the polyester resin composition of the present invention.

Among the cycloaliphatic dicarboxylic acids which may be used in the adhesive polyester resin as component D are hexahydroorthophthalic acid, hexahydrometaphthalic acid, hexahydroparaphthalic acid, and the like. These and comparable acids may be used either singly or in combination with one another, but the mol percent range still prevails whether used singly or jointly.

It is to be noted that the total amount of the first two components of the adhesive polyester resin, namely the two dihydric alcohol materials, should total approximately 50 mol percent in the ultimate polyester resin composition produced. Analogously, the two dicarboxylic acid components should total approximately 50 mol percent, based on the total polyester resin composition. The total of the various four components should, of course, add up to 100%. In the preparation of the adhesive polyester resins, it will be desirable to use a small excess amounting to about 5 or 10% of the dihydric alcohol components, based on stoichiometrical calculations required to achieve substantially complete esterification, but the excess dihydric alcohol materials used remains unreacted at the completion of the process and do not enter into the final composition and are preferably stripped off to yield a normally solid, non-crystalline, self-cross-linkable polyester resin composition.

The term "self-cross-linkable" as used in the description of the adhesive polyester resin refers to the capability of the unsaturated polyester resins to cross-link with themselves without benefit of a cross-linking monomer such as styrene, methyl methacrylate, diallylphthalate and the like. It obviously does not preclude the use of a free radical producing catalyst such as those described elsewhere herein, since it is desired to make use of such catalyst to facilitate the cross-linking of these polyester resin compositions.

The unsaturated polyester resins can be and preferably are used without benefit of a polymerizable monomer as adhesives in the weather-resistant decorative laminated articles of this invention. However, one could utilize any of the conventional cross-linking agents used generally with unsaturated polyester resins for purposes other than outdoor vertical laminate purposes. Among the polymerizable monomers frequently used in this connection with the unsaturated polyester resins generally are styrene, ring-substituted alkyl and halo styrenes, and allyl monomers such as diallyl maleate, diallyl phthalate, triallyl cyanurate, and the like. Since this approach is well-known in the art, it is deemed sufficient to make reference to the U.S. Patents 2,255,313, 2,443,735–41, inclusive, 2,510,503, and 2,510,564 and to incorporate the same herein by reference. Since, the conventional cross-linking agents are generally solvents for the self-cross-linkable polyester resin, the term "organic solvent" is used herein to include these cross-linking agents and the inert organic solvent vehicles for the polyester resin which are described hereinafter, as well as mixtures of the cross-linking agents and inert organic solvents.

In utilizing the self-cross-linkable polyester resins as adhesive materials in the preparation of the laminated articles of this invention, the polyester resin is first dissolved in a suitable inert organic solvent such as benzene, toluene, xylene, chloroform, ethylene dichloride, trichloroethylene, nitromethane, dimethylformamide, and the like. Once dissolved in these solvents, or mixtures thereof, the solution may be utilized by addition thereto, just prior to use, of catalytic quantities of conventional peroxide catalysts normally used for this general purpose. Included in the group of catalysts suitable for this purpose are benzoyl peroxide, tertiary butyl hydroperoxide, di-tertiary butyl peroxide, cumene hydroperoxide, 1-hydroxy cyclohexyl peroxide-1, and the like. The aliphatic peroxides are particularly preferred. Combinations of catalysts and accelerators can be used if desired. The amount of catalyst used may be varied from about 0.1% to 10%, by weight, based on the total weight of the resin solids and preferably between about 1 and 3%, same basis. The use of a catalyst can be avoided by using thermopolymerization conditions, but best results are achieved by the combination of thermal and catalytic conditions.

Any conventional method, e.g., dip-, brush-, flow-, roller- or spray-coating, can be used in coating the substrate member with the organic solution of the self-cross-linking, normally solid, non-crystalline adhesive polyester resin of this invention.

A distinct feature of novelty of our unique laminated article is its base or core member. This member is of plastic composition and preferably is a thermoplastic synthetic resin such as polyvinyl chloride, although certain other thermosetting resins have also been notably useful in this regrad. In addition to polyvinyl chloride, a cross-linked polyester reaction product of (a) an ethylenically unsaturated polyester derived from reaction of an unsaturated lower carboxylic acid and a polyhydric alcohol and (b) a partially unsaturated monomer may be employed. This product is more particularly described in U.S. Patent 2,255,313 of Ellis of Sept. 9, 1941, as well as U.S. Patents 2,443,735 and 2,443,736 of Kropa of June 22, 1948, all of which documents are incorporated by reference herein. The aforesaid thermosetting resin has excellent heat resisting properties and may readily be admixed with glass fiber mats in up to 50% by weight of the total composition to serve as a staunch substrate or base.

The prime function of our plastic base member is to supply rigidity to the laminate structure. It is, of course, to be understood that our novel laminate article, may itself, be supported by or bonded to any other convenient backing either organic or inorganic, i.e., in the latter case, for example, asbestos, cement board or glass.

The polyvinyl fluoride film employed in the practice of this invention is a commercially available material having a thickness of from about 0.5 to 5 mils. The particular grade of film is that which is clear or substantially transparent, i.e., a film which is non-pigmented. In addition, the polyvinyl fluoride film must be pre-treated to render at least one side thereof adherable. By "adherable" is meant any condition imposed on a surface of the film by various physical or chemical techniques to render the surface of the film susceptible to bonding with conventional substrates, among which are included cellulosic materials, e.g., wood, paper, fiber board, and the like; metals, e.g., galvanized steel, aluminum, and the like; flexible plastics, felts, papers and the like; as well as conventional thermoplastics and thermosetting resinous surfaces.

Methods of manufacturing polyvinyl fluoride films useful in the present invention are well-known in the art and, therefore, need not be described herein. One such method, is that of U.S. Patent 2,953,818, herein incorporated by reference. The various treatments used to render one or both surfaces of polyvinyl fluoride films adherable are also known in the art, e.g., Belgian Patents 610,318, 619,638 and 620,723.

Thus, in Belgian Patent 619,638, there is described a method of making one side of a polyvinyl fluoride film adherable without affecting the non-adherability of the other side by passing the film around an electrically grounded rotating drum, while the outer face is electrically charged by passage close to a D.C. electrode, causing the film to adhere strongly to the drum. The film is next passed a certain distance from a set of tubular electrodes carrying an A.C. current. Nitrogen is flowed through the tubes and into the space between the electrodes and the drum. The film is then conducted away from the grounded drum. Belgian Patent 620,723 is a variation on the foregoing process and involves exposing the films of polymerized fluorinated hydrocarbons to an electric discharge in an atmosphere having a limited moisture content by passing the film around a grounded rotating drum serving as the negative electrode, with one or more positive electrodes affixed a certain distance from the drum and parallel to its axis of rotation. During this treatment, the atmosphere having limited moisture content is constantly renewed through outlets near the electrodes. For further details, see the aforementioned Belgian patents which are herein incorporated by reference.

A convenient method for determining whether a surface of a polyvinyl fluoride film is adherable for the purposes of the present invention is to compare the behavior of an unknown film X to the behavior of a film N which is known to be non-adherable. Both films are cleaned with a cloth saturated with a solution of 30% by weight, n-propyl alcohol in water. After allowing the film to dry, a drop of the same solution is squeezed from an eye dropper onto the surface of each film. If the film X is adherable, the drop will spread at a rate approximately twice as fast as that on film N, i.e., the area covered by the drop on film X will be twice the area covered on film N over the same space of time. For example, after about 10–20 seconds from the time of application of the drop, if both films are non-adherable, the drops will spread at approximately the same rate in each application.

Substantially, transparent polyvinyl fluoride films treated to impart adherability on one or both sides may be used. When a film with a single adherable side is employed, the adherable side will, of course, be on the side which is bonded to the substrate member.

As previously indicated, coating, drying, and partial advancement of the curable resinous composition used to treat the substrate can be carried out in one step or in separate stages. However, care must be taken to avoid heating the coated sheet to the point at which inert organic solvent being given off causes bubbling, since this can cause discontinuity, which in turn leads to poor bonding, particularly if, at the same time, the curable resinous composition is advanced to the point at which its flow under the relatively high pressures applied in the subsequent laminating step will be substantially diminished. Thus, one step drying (coupled with partial advancement) will preferably be carried out at a temperature ranging from about 80° C. to about 150° C. for from about 20 minutes to about 5 minutes.

An alternative procedure would be to coat an adherable side of the polyvinyl fluoride surface film with the thermosetting resinous adhesive mixture, partially advance the cure of the resin, and then proceed with the heat and pressure consolidation step to bond the overlay film to the rigidity-imparting base member. Moreover, it has been found that a thickness of at least one sixteenth of an inch for the base member is especially desirable when the laminate is consolidated in an initial laminating step by means of heat and pressure or afterwards by adhesive bonding, with an additional solid or precured substrate of asbestos-cement board, woll, cellulose, particle board, or the like, in that base members having at least this minimum thickness are better able to relieve or take up stresses produced by various additional substrates or backing surfaces certain of which are relatively dimensionally unstable, thereby insuring the prevention of cracking or crazing on the decorative surface of the laminate. It has also been found that the thickness of the solid substrate should be correlated with its density whereby said substrate is adapted to retain its form under moderate stress. The maximum thickness of any of the base members in question is governed by practical considerations, e.g., cost, availability, where and how finished laminate is to be used, and so forth.

Conventional laminating techniques are employed in preparing laminates from the above-described base members, and substantially transparent top films. Thus, the adherable polyvinyl fluoride top film is placed with an adherable side against the thermosetting adhesive mixture-covered side of the substrate member or, where the polyvinyl fluoride top film is coated with the adhesive resin on an adherable side, said film is placed with its coated side against the substrate member. Then top film and substrate are assembled and inserted in a laminating press between laminating press plates which may have finishes ranging from a mirror polish to a matte surface, either as a single assembly or as a multiple assembly of two or more of such single assemblies, and consolidated by means of heat and pressure into a unitary decorative structure. Besides laminates having only one decorative surface, balanced laminates wherein an adherable polyvinyl fluoride film having a suitable ultra-violet absorber is bonded to each side of a base or core member may also be prepared.

Temperatures ranging from about 135° C. to about 160° C., preferably from about 140° C. to about 150° C., and pressures ranging from about 150 p.s.i. to about 1500 p.s.i., will be employed. The particular pressure employed depends in large measure upon the nature of the base member, and the degree of advancement of the adhesive employed. The time required to effect substantially complete cure of the resinous components of the assembly when employing temperatures and pressures within the above-stated ranges will usually be from 15 minutes to about 45 minutes. The resulting laminate is generally allowed to cool to a temperature of less than about 50° C., and preferably to room temperature, before being removed from the press.

In order that those skilled in the art may more fully understand the inventive concept presented herein, the following examples are set forth. These examples are set forth primarily for illustration, and should not be considered as expressing limitations unless so set forth in the appended claims. All parts and percentages are by weight, unless otherwise stated.

Preparation of curable polyester type adhesive resins

Adhesive polyester resins typical of the curable adhesive resins useful in the practice of the present invention may be prepared as follows:

Into a suitable reaction vessel equipped with stirrer, thermometer, temperature controller, gas inlet tube (below the liquid surface), and a gas exit tube fitted with a steam condenser, there is introduced 247 parts of 1,3-butylene glycol, 792 parts of 1,4-cyclohexanedimethanol, 580 parts of fumaric acid, 385 parts of hexahydrophthalic anhydride and 2 parts of tertiary butyl catechol. The reactants are blanketed with a carbon dioxide atmosphere (200–300 cc./minute) and heated with constant stirring to about 195–200° C. until an acid number of about 15 is reached. The condenser is then removed and the inert gas rate is increased to about 10 liters/minute in order to remove the excess glycol. The sparging is continued until a sample of the resin has a hardness value of 38–40, as measured at 25° C. with a Barcol Model 936 "Impressor." The final acid number is 10.8. The finished resin is cooled to 170° C. and poured with stirring into sufficient toluene so as to prepare a 70% resin solids solution. Alternatively, the neat resin is poured directly into an aluminum tray and cooled to room temperature. The cooled resin is a glassy solid which is non-sticky to the touch, but with a tendency to cold-flow.

Adhesive resin A

Into a suitable reaction vessel equipped as above, there is introduced 54.9 parts of 1,3-butylene glycol, 190.2 parts of 1,4-cyclohexanedimethanol, 132.2 parts of fumaric acid, 87.7 parts of hexahydrophthalic anhydride and 0.45 part of tertiary butyl catechol. The procedure outlined in the above preparation was followed in all details except that the batch was heated at about 205° C. for about 20 hours under a blanket of nitrogen, introduced at a rate of 50 ft.$^3$/hour. At the end of the 20 hour cook cycle, the acid number of the resin was about 15 and the Barcol Model 936 hardness of a cured sample was 40 at 25° C. without requiring the final sparging step. The finished adhesive resin, in a 30% solids solution in dimethyl phthalate, has a Gardner-Holdt viscosity of U=V at 25° C., and the color is 1 on the Gardner color 1933 scale. The resin may then be drawn hot (180° C.) into a second stirred kettle containing sufficient toluene to prepare a 70% solids solution for further dilution to any desirable solids concentration.

The following embodiments of my invention are intended to illustrate the use of the aforesaid adhesive resins in the actual construction of laminate articles. In these examples, all of the parts shown are by weight unless otherwise indicated. These examples are as follows:

Example 1

The adherable side of a commercially available polyvinyl fluoride film containing an ultraviolet absorber therein was coated with a solution of adhesive resin A, whose preparation is shown above, in toluene by brushing the adhesive solution thereon. The solution consisted of 100 parts of adhesive A, 100 parts of toluene, 1.43 parts of 2,6-ditertiary butyl-peroxy-2,6-dimethyl hexane, 0.57 part of tertiary-butyl hydroperoxide and 0.233 part of cobalt naphthenate (6% cobalt metal). The coated polyvinyl fluoride film has a resin pickup of the curable resinous composition of about 8 grams/1 ft.$^2$. This coated film is then air-dried in an oven at 130° C. to allow the solvent to evaporate.

The dried and coated polyvinyl fluoride film is then placed on top of a ⅛" sheet of clear, rigid polyvinyl chloride with the coated side of the polyvinyl fluoride film contacting the polyvinyl chloride sheet. The total assembly is then positioned between a pair of stainless steel press plates having a mirror polish finish and laminated at a pressure of 600–800 p.s.i. while heating the press from room temperature to 80° C. When the temperature reaches 80° C. the pressure is reduced gradually until final cure is achieved by maintaining a pressure of 100–200 p.s.i. at the maximum cure temperature of 145° C. for 30 minutes.

The resulting laminate structure after being allowed to cool to room temperature is removed from the press and has a smooth glossy surface. Its properties are demonstrated in Table I below.

Example 2

On a smooth glass plate, a 10 mil film of white pigmented commercially available polyester gel coat resin was drawn down with a draw blade. The resin contained one part by weight of catalyst per 100 parts, by weight, of the resin. After the resin has gelled in about 30–45 minutes, a film of commercial adherable polyvinyl fluoride 1.5 mils thick and containing an ultraviolet absorber was placed on top of the gel coat surface and pressed to insure intimate contact. The polyvinyl fluoride film had been treated on the adherable side with adhesive A and dried as described in the preceding example. When the film was placed on top of the gel coat, care was taken to place the adhesive treated side of the film in contact with the gel coat.

The assembly was then removed from the glass plate and placed between two stainless steel press plates having a mirror polish finish with a film of cellophane on each side to separate the resin from direct contact with the press plates. The assembly of all these components was then placed in the press and allowed to cure at 145° C. An initial pressure of 200 p.s.i. was applied for 2 minutes, then the pressure was raised to 700 p.s.i., and was maintained at that level for 20 minutes. After cooling, the press plates and their contents were removed from the press. The gel coat with the polyvinyl fluoride coating on one side was released from the cellophane film, and was placed on smooth glass plate with the polyvinyl fluoride side contacting the glass.

A sheet of glass mat was laid on top of the gel coat, and a curable commercially available polyester resin (which is a resinous formulation comprising propylene glycol, phthalic anhydride, fumaric acid, hydroquinone, cobalt metal, and a mixture of 62% alkyd condensate with 38% styrene monomer) combined with 1% by weight, methyl ethyl ketone peroxide catalyst was poured on the glass mat until it is saturated. The whole assembly of glass plate, laminate, glass mat, and polyester resin was then wrapped in cellophane, and the resin was worked to smooth it and remove bubbles. After smoothing, the whole assembly was allowed to cure at room temperature. This takes a few hours. After curing, the laminate when released from the cellophane, has a smooth, glossy decorative surface and is quite rigid.

In the aforesaid examples, use of about 1 percent of an ultra-violet absorber such as 2-hydroxy-4-methoxy benzophenone in the overlay resin will give a product having the properties of good color stability and clarity. For a comparison of the products of the invention when contrasted with untreated materials, see Table I, hereinbelow. As will be noted from the table, the laminate structures which lack a clear polyvinyl fluoride overlay have a very poor resistance to exposure, in addition to exhibiting profound color change and chalking in that instance where the substrate is pigmented.

It should, also be pointed out that while applicant has expressed certain preferences for ultra-violet light absorbers, it of course, now becomes obvious to those skilled in the art that a large number of such absorbers as illustrated by U.S. Patent No. 2,777,828, to Day, incorporated by reference herein, may also be employed. It is applicant's intention to embrace these also.

TABLE I.—WEATHEROMETER EXPOSURE DATA ON PLASTIC SYSTEMS PROTECTED WITH POLYVINYL FLUORIDE

| Sample number | Plastic substrate | Color | Clear polyvinyl fluoride coating | Adhesive type | Weatherometer exposure, hours | Color change, E | Notes |
| --- | --- | --- | --- | --- | --- | --- | --- |
| 9-63-9 | Polyvinyl chloride | Clear | None | None | 2,000 | 47.7 | |
| 9-63-8 | do | do | 1 mil | Polyester A | 5,000 | 9.7 | |
| 8-63-31 | Linear polyester | White gel coat | None | None | 5,000 | 5.4 | Chalking. |
| 8-63-33 | do | do | 1 mil | Polyester A | 5,000 | 1.3 | No chalking. |

What is claimed is:

1. A unitary, heat and pressure consolidated weather resistant laminate which consists of:
   (I) A rigidity imparting resinous plastic substrate in sheet form and
   (II) at least one adjacent sheet of a substantially transparent overlay member of adherable polyvinyl fluoride, an adherable side of which is directly bonded to said substrate member by means of
   (III) a curable adhesive mixture which comprises a curable adhesive polyester resin comprising the esterification product of:
      (A) from about 34 to 49 mol percent of a cycloaliphatic dihydric alcohol,
      (B) from about 1 to 16 mol percent of an asymmetrical linear aliphatic dihydric alcohol,
      (C) from about 30 to 49 mol percent of an α,β-ethylenically unsaturated dicarboxylic acid selected from the group consisting of fumaric acid and itaconic acid, and
      (D) from about 1 to 20 mol percent of a cycloaliphatic dicarboxylic acid, wherein the total mol percent of all components is 100%,
   and having an ultra-violet light absorber incorporated in said overlay member.

2. A unitary heat and pressure consolidated weather resistant laminate structure according to claim 1 wherein (I) is polyvinyl chloride.

3. A unitary heat and pressure consolidated weather resistant laminate structure according to claim 1 wherein the plastic substrate member (I) is a cross-linked linear unsaturated polyester.

4. A unitary heat and pressure consolidated weather resistant laminate structure according to claim 2 which comprises a substantially transparent overlay member of adherable polyvinyl fluoride containing an ultraviolet light absorber, of a substituted benzophenone.

5. A unitary heat and pressure consolidated weather resistant laminate structure according to claim 1 wherein the substrate is polyvinyl chloride, the curable adhesive mixture is a polyester resin wherein (A) is a cycloaliphatic dihydric alcohol selected from the group consisting of 1,4-cyclohexane dimethanol, cyclohexane-diol-1,4, and 2,2-propylidine bis parahydroxy cyclohexane, (B) is 1,3-butylene glycol, (C) is fumaric acid, and (D) is hexahydrophthalic acid.

References Cited

UNITED STATES PATENTS

| | | | |
|---|---|---|---|
| 3,133,854 | 5/1964 | Simms | 161—189 |
| 3,194,725 | 7/1965 | Pounds | 161—165 |
| 3,228,823 | 1/1966 | Usala et al. | 161—186 |
| 3,257,266 | 6/1966 | Sapper | 161—189 X |
| 3,284,277 | 11/1966 | Bonacci et al. | 161—189 X |
| 3,313,676 | 4/1967 | Kamal et al. | 161—254 X |
| 3,359,153 | 12/1967 | Bean | 161—233 X |
| 3,379,606 | 4/1968 | Bratton et al. | 161—189 |
| 2,970,066 | 1/1961 | Brasure | 117—33.3 |

HAROLD ANSHER, *Primary Examiner.*

U.S. Cl. X.R.

161—233, 256